United States Patent Office 3,285,966
Patented Nov. 15, 1966

3,285,966
ETHERS AND METHODS OF PREPARATION
Marvin J. Hurwitz, Elkins Park, and Ellington M. Beavers, Meadowbrook, Pa., assignors to Rohm & Haas Company, Philadelphia, Pa., a corporation of Delaware
No Drawing. Filed Oct. 19, 1960, Ser. No. 63,466
5 Claims. (Cl. 260—614)

This invention concerns new and valuable halo-t-alkyl ethers. The invention also concerns a method for butenylating the halo-t-alkyl ethers to ether substantial allyl halides. Embodiments related to the invention concern a method of coupling the ether substituted allyl halides to give the corresponding diunsaturated diethers. In a further embodiment, there is provided a process for making saturated diethers, and in another related embodiment there is provided a group of valuable glycols in which each alcohol group has a neopentyl structure, and which are named herein "bis-neopentyl structured glycols."

Alcohols which contain a neopentyl structure are valuable in certain commerical applications. However, methods for the introduction of the neopentyl structure into the alcohol product by alkylation present great difficulties and often result in a loss of the neopentyl or the alcohol group through molecular rearrangement. During the research work that was initiated for the preparation of such neopentyl alcohols, a new approach to this problem was devised. The idea was conceived that a neopentyl alcohol could be made from a starting material which contained the neopentyl structure, provided suitable conditions could be developed that would preserve this branched group.

In accordance with this plan, β-hydroxyl-t-butyl chloride was selected as what seemed to be an ideal starting material, since it offered the needed branching and the hydroxyl group for the final alcohol. Yet, this chlorohydrin failed to undergo butenylation. It was then believed that some form of protection was necessary to shield the reactive hydroxyl group. But, when chloroisobutyl acetate, in which the potential hydroxyl function is protected as an ester group, was treated with butadiene, again no butenylation reaction took place. Other starting materials, like chlorooctenyl chloride and cyanooctenyl chloride, also failed to undergo butenylation. A tentative conclusion was that the branched structure was too unreactive to undergo butenylation.

In accordance with this invention, it was then unexpectedly found that a specific group of haloalkyl ethers of the formula

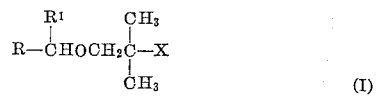

$$R-\overset{R^1}{\underset{}{C}}HOCH_2\overset{CH_3}{\underset{CH_3}{C}}-X \quad (I)$$

wherein R, R¹, and X are further defined below, undergo butenylation to form valuable ether substituted allyl halides. These in turn are converted to long-chain diunsaturated diethers by reductive coupling. And, a group of these ether substituted allyl halides gives the corresponding saturated diethers, whereas another valuable class of these ethers yields the final long-chain glycols with terminal bis-neopentyl configuration.

The first embodiment of the invention concerns the haloalkyl ethers of Formula I wherein R and R¹ are defined as a hydrogen atom or a hydrocarbon group free of non-aromatic unsaturation, that is, free of acetylenic and ethylenic unsaturation. Typically, R and R¹ represents an alkyl group which may be straight or branched, including the cycloalkyl group; or R may be aryl, arylalkyl, or alkyl. Typically, R may be methyl, propyl, isopropyl, butyl, amyl, isoamyl, hexyl, 2-ethylhexyl, 3,5-dimethyl-octyl, n-octyl, cyclopentyl, cyclohexyl, 2 - methylcyclohexyl, benzyl, xylyl, ethylbenzyl, t-butylbenzyl, n-dodecylbenzyl, octadecylbenzyl, phenyl, phenethyl, phenpropyl, and the like.

For practical considerations, the total carbon content of R and R¹ is generally not more than 18 carbons atoms; X is a halogen atom of an atomic number of 17 to 35, inclusive. Because of availability, the chlorine compounds are generally employed, but the bromine compounds may also be used, especially when a somewhat faster reaction is preferred. Instead of bromine or chlorine, X may also represent iodine.

Typical haloalkyl ethers of the invention include:

β-methoxy-t-butyl chloride,
β-methoxy-t-butyl bromide,
β-(α'α'-dimethylbutanoxy)-t-butyl chloride,
β-(α'α'-dimethylhexanoxy)-t-butyl chloride,
β-(α'-methyl-δ'-ethylpentanoxy)-t-butyl chloride,
β-octadecanoxy-t-butyl chloride,
β-(α'-ethyldecanoxy)-t-butyl chloride,
β-hexanoxy-t-butyl chloride,
β-("iso"-octanoxy)-t-butyl chloride,
β-isopropoxy-t-butyl chloride,
β-(α'-ethylhexanoxy)-t-butyl chloride,
β-benzyloxy-t-butyl chloride,
β-diphenylmethoxy-t-butyl chloride,
β-cyclohexanoxy-t-butyl chloride,
β-phenylpentoxybutoxy-t-butyl chloride,
β-phenylbutoxy-t-butyl bromide, and
β-(α'-ethylhexylbenzyloxy)-t-butyl chloride.

The haloalkyl ethers of Formula I are new and valuable compounds. They are pesticides useful in combatting fungi, bacteria, and insects. The ethers may be used also as herbicides for plant control. As fungicides, the halogenated ethers are active against *Stemphylium sarcinaeforme* and *Monilinia fructicola*, the fungi responsible for common fungal infections. When the ethers are used in the control of pests, they may be compounded into emulsifiable oil concentrates, dust compositions, water dispersible powders and the like. Moreover, the ethers are useful rodenticides. They can also be used as anesthetics and since they are compounds of low volatility they are valuable in warm climates.

The haloalkyl ethers of Formula I are obtained from allylic ethers of the formula

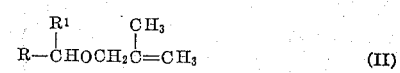

$$R-\overset{R^1}{\underset{}{C}}HOCH_2\overset{CH_3}{\underset{}{C}}=CH_3 \quad (II)$$

where R and R¹ are defined above. Typical allylic ethers include methallyl benzyl ether,
methallyl diphenylmethyl ether,
methallyl p-xylyl ether,
methallyl m-xylyl ether,
methallyl butylbenzyl ether,
methallyl isopropyl ether,
methallyl methyl ether,
methallyl octyl ether,
methallyl isooctyl ether,
methallyl dodecyl ether,
methallyl isohexyl ether,
methallyl α-ethylhexyl ether,
methallyl cyclohexyl ether, and the like.

Amongst these, the methallyl benzyl ether, the methallyl diphenylmethyl ether and their respective ring substituted homologues, are unique compounds, which exhibit uncommon advantageous properties in comparison with the methallyl aliphatic ethers. For instance, by catalytic hydrogenation, under mild temperature, methallyl benzyl ether gives isobutanol and toluene. Also, methallyl benzyl ether copolymerizes with vinyl and ethylenically unsaturated monomers to give polymers that are unusually tougher and harder than those obtained from the methallyl alkyl ethers. Typical copolymerizable vinyl monomers include acrylate and methacrylate esters in which the alkyl group in the alcohol portion of the ester contains, generally 1 to 18, carbon atoms, such as methyl acrylate, methyl methacrylate, 2-ethylhexyl acrylate; other monomers like styrene, vinyl acetate, diethyl itaconate, vinylidene chloride, ethylene, propylene, vinyl chloride, diallyl itaconate, and the like.

The method of preparation of the haloalkyl ethers comprises reacting the allylic ethers of Formula II with a halogen acid. Advantageously, hydrochloric or hydrobromic acids may be used. The reaction is exothermic and it may reach 100° C. or more. For improved yields and safety, the reaction temperature is maintained between 0° and 50° C., preferably not exceeding 30° C. Addition of the acid is preferably gradual. Theory requires one mole of halogen, but an excess, such as 100 mole percent, may be used. The progress of the reaction is followed by the uptake in weight of the product or by the course of the exotherm. When the exotherm subsides, the reaction is generally complete. For convenience, it is advisable to operate in the presence of an inert solvent; typical suitable solvents are aliphatic and aromatic hydrocarbons, such as xylene, benzene, pentane, and the like. At the end of the reaction, the organic phase is separated and the solvent is distilled off; the halo-t-alkyl ether product is obtained by distillation, preferably under reduced pressure.

In accordance with another embodiment of the invention, the halo-t-alkyl ethers of Formula I are butenylated in accordance with a process which comprises reacting these ethers, under anhydrous conditions, with butadiene in the presence of a Lewis acid catalyst.

The reaction between the haloalkyl ether and butadiene is exothermic; accordingly, for good yields the reaction is conducted at a temperature range below that which will cause substantial polymerization of butadiene and/or substantial dehydrohalogenation of the product. The reaction proceeds at a temperature range of −10° to 100° C., but for better results a temperature of 0° to 50° C., and preferably 5° to 40° C., is available. The temperature is maintained within the desired range by suitable cooling methods and/or by controlling the feed rate of the butadiene; a slow rate tends to keep the temperature low while the temperature tends to increase with an increasingly faster rate of feed. A very suitable set of conditions brings about substantial butenylation of the haloalkyl ether by the time the exotherm has subsided.

Compounds having a chemical configuration similar to that of butadiene may be employed in place of the butadiene to form similar products, although usually in reduced yields. Among the compounds that may be satisfactorily used are isoprene, cyclopentadiene and hexadiene.

Atmospheric pressure is normally employed. Pressures greater than atmospheric may be conducive to improved yields, possibly because increasing the pressure tends to keep the butadiene in the reaction medium and restrict its premature exit from the proximity of the co-reactant.

The progress of the buetenylation can be determined by measuring the weight increase of the products, the reaction being substantially complete when the product increase in weight corresponds to one mole of butadiene. Alternatively, the reaction is substantially complete when no further uptake of butadiene is observed and/or the exotherm has subsided. Additional time of contact between reactants, with or without mixing, may be allowed to insure completion of the reaction.

To promote the butenylation, a Lewis acid catalyst is employed, preferably a weak Lewis acid, especially those having a pK value of 21 to 35.

The amount of catalyst used may vary from 0.5 to 50% by weight; generally 1 to 10% is satisfactory. Typical catalysts include: zinc chloride, zinc stearate, ferric chloride, aluminum chloride, titanium tetrachloride, stannic chloride, nickel chloride, cobalt 2-ethyl hexanoate, zinc acetate, zinc sulfate, lead stearate, and the like. Amongst these, stannic chloride is presently preferred. If desired, a solvent for the catalyst may be used.

Desirably, the reaction may be conducted in the presence of an inert solvent. In this manner, the reaction is facilitated; the loss of butadiene is minimized, for instance, by condensing the butadiene in the solvent before addition to the reactant. Sometimes, the presence of the solvent increases the effectiveness of the catalysts. Typical suitable solvents include chloroform, ethylene dichloride, methylene chloride, other common chlorinated solvents, acetic acid, formic acid, or the like.

The butadiene may be brought into contact with the reactant in any convenient manner; if desired, it may be condensed in the solvent or it may be fed into the reaction mixture.

At the conclusion of the reaction, the reaction mixture is washed with water, followed by acid and alkali washes. Solvent, water and unreacted components are removed by stripping and the product is distilled, preferably under reduced pressure.

The ether substituted allyl halide products of the reaction of the haloalkyl ethers of Formula I with butadiene may be represented by the following formula:

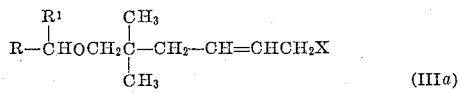

(IIIa)

and

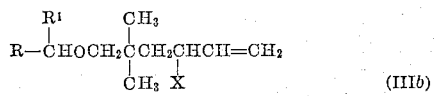

(IIIb)

in which X, R, and $R^1$ are defined above. The R and the $R^1$ substituents need not be identical and such mixed esters are obtained from a mixture of different haloalkyl ethers.

Typical ether substituted allyl halides include 1-chloro-5,5-dimethyl-6-methoxyhexane-2,
1-chloro-5,5-dimethyl-6-isopropoxyhexene-2,
1-chloro-5,5-dimethyl-6-benzyloxyhexene-2, and
1-chloro-5,5-dimethyl-6-($\alpha'$-ethylhexylbenzyloxy)hexene-2,
1-bromo-5,5-dimethyl-6-(p-n-propylbenzyloxy)hexene-2,
3-chloro-5,5-dimethyl-6-methoxyhexene-1,
3-chloro-5,5-dimethyl-6-isopropoxyhexene-1,
3-chloro-5,5-dimethyl-6-benzyloxyhexene-1,
3-chloro-5,5-dimethyl-6-diphenylmethoxyhexene-1,
1-chloro-5,5-dimethyl-6-diphenylmethoxyhexene-2,
3-chloro-5,5-dimethyl-6-xylyloxyhexene-1,
1-chloro-5,5-dimethyl-6-ethoxyhexene-2,
1-bromo-5,5-dimethyl-6-dodecanoxyhexene-2,
3-chloro-5,5-dimethyl-6-ethoxyhexene-1,
3-chloro-5,5-dimethyl-6-cyclohexanoxyhexene-1,
3-chloro-5,5-dimethyl-6-($\alpha'$-methylcyclohexanoxy)hexene-1,
3-chloro-5,5-dimethyl-6-($\alpha'$-methylcyclopentanoxy)hexene-1,
3-chloro-5,5-dimethyl-6-($\alpha'$-ethylhexanoxy)hexene-2,
1-chloro-5,5-dimethyl-6-($\alpha'$-ethylhexanoxy)hexene-1,
3-chloro-5,5-dimethyl-6-dodecanoxyhexene-1,
1-chloro-5,5-dimethyl-6-($\alpha',\alpha',\beta'$-trimethylpentanoxy)hexene-2,
3-bromo-5,5-dimethyl-6-($\alpha',\alpha',\gamma'$-trimethylpentanoxy)hexene-1,
and the like.

The 1-halo-5,5-dimethylhexene-2-ethers and the 2-halo-5,5-dimethylhexene-1 ethers are generally obtained in a mixture which is generally predominantly, i.e. 60 to 70 mole percent, of the 1-halo hexene-2 type, the remainder 30 to 40 mole percent being the 2-halo hexene-1 type.

These mixtures are readily resolved into their components by suitable methods, as by gas chromatography.

The ether substituted allyl halides of Formula III are unique and valuable products. They are useful as chemical intermediates to form valuable compounds. They react with tertiary amines to form quaternary ammonium compounds useful as bactericides; they react with phenols and then, by undergoing Claisen rearrangement, they yield compounds useful as germicides and pesticides. Moreover, the ethers of the invention react with hydrogen cyanide to give useful starting materials to make amines, acids, esters, and amides of value as oil additives to inhibit corrosion and as viscosity improvers. Also, these ethers are useful as high boiling solvents; they act as chain transfer agents in free radical polymerization. They are antioxidants in fuels. They are useful pesticides. As fungicides, they inhibit the germination of *Monilinia fructicola* and *Stemphylium sarcinaeforme* in standard fungitoxicity tests. They can be used as insecticides, as bactericides, and as miticides. Also, the ethers are useful rodenticides. They can be used to combat soil infestations, or as a herbicide. The ether substituted allyl halides may be formulated in dusts, wettable powders, or emulsion concentrates in the protection of plants.

In another embodiment of the invention, the ether substituted allyl halides are reacted to form the corresponding diunsaturated diethers by heating in the presence of a coupling agent.

The coupling process of the ether substituted allyl halides comprises heating the ethers at a temperature from about 10° C. to about 150° C. but below the temperature which will cause decomposition of the product formed. A preferable range is 20° to about 90° C., generally giving very satisfactory results. Optimum temperature, of course, depends on the particular reactant and, in particular, the solvent selected, if it is desired to use one.

Preferably the ethers are heated in the presence of a coupling agent. Typical of these is iron. Improved results are obtained with finely divided iron. At least one-half mole of iron is employed per mole of ether and it is advantageous to use an excess in the order of 10 to 50 mole percent.

A further improvement in efficiency may be obtained by using, in conjunction with the coupling iron, a metal or a salt of a metal which is below iron in the electromotive series. The metals which may be employed in conjunction with the catalyst include cadmium, cobalt, nickel, tin, lead, palladium, copper, mercury, silver, gold and platinum. The salts of the strong inorganic acids are typified by the chlorides, sulfates, nitrates, and phosphates. The amount of such metal that may be employed ranges from about 1 to 15%, preferably 2 to 8%, calculated as metal and based on the weight of the iron.

The coupling of the ether substituted allyl halides is preferably carried out in the presence of a solvent. Typical solvents include paraffinic or aromatic hydrocarbons, such as pentane or benzene and xylene and alcohols, such as butyl, hexyl, and benzyl alcohols; ethers, like diisopropyl ether, diethyl ether, tetrahydrofuran, methyl-n-butyl ether; nitriles having a lower alkyl group, such as acetonitrile, propionitrile, and the like.

The reaction can be carried out under normal, super-, or subatmospheric pressure; but for reasons of efficiency it is preferred to employ normal or superatmospheric pressures.

Preferably, the reaction is carried out under an inert atmosphere, such as nitrogen.

The progress of the coupling reaction may be followed by any suitable method for measuring the extent of the redox reaction which is taking place. At the end of the reaction, the organic layer is separated with or without the assistance of a solvent. Solvent and water are removed by stripping and the product is distilled, preferably at reduced pressures.

The main diunsaturated diether product of the coupling of the ether substituted allyl halides may be represented by the general formula:

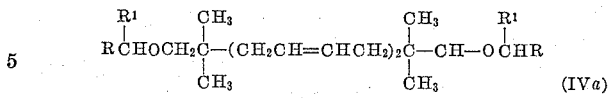

and

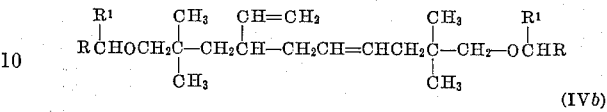

wherein R and $R^1$ have been defined above. If desired, the two R substituents and the two $R^1$ substituents need not be identical, such ethers being obtained by coupling two ether substituted allyl halides in which R and $R^1$ are different. Ethers of type (IVa) and those of type (IVb) are generally obtained in a mixture in which there may also be present small amounts of a third type of isomer, a 1,8 - dialkoxy or diaryloxy - 2,2,7,7 - tetramethyl - 4,5-divinyloctane. Resolution of the mixture is readily effectuated by known methods, as by chromatography.

Typical ether substituted allyl halides of the invention include 1,12-dimethoxy-2,2,11,11-tetramethyldodecanediene-4,8,
1,12-isopropoxy-2,2,11,11-tetramethyldodecanediene-4,8,
1,12-dibenzyloxy-2,2,11,11-tetramethyldodecanediene-4,8,
1,12-diphenylmethoxy-2,2,11,11-tetramethyldodecanediene-4,8,
1,12-di-(m-isopropylbenzyloxy)-2,2,11,11-tetramethyldodecanediene-4,8,
1,12-dixylyloxy-2,2,11,11-tetramethyldodecanediene-4,8,
1,12-di-(m-n-propylbenzyloxy)-2,2,11,11-tetramethyldodecanediene-4,8,
1,12-di($\alpha'$,$\alpha'$,$\gamma'$-trimethylpentanoxy)-2,2,11,11-tetramethyldodecanediene-4,8,
1,12-di($\alpha'$-methylcyclopentanoxy)-2,2,11,11-tetramethyldodecanediene-4,8,
1,12-didodecanoxy-2,2,11,11-tetramethyldodecanediene-4,8,
1,12-dioctadecanoxy-2,2,11,11-tetramethyldodecanediene-4,8,
1,12-di($\alpha'$-methyl-$\beta'$-ethylpentanoxy)-2,2,11,11-tetramethyldodecanediene-4,8,
1,12-di-(m-n-propylbenzyloxy)-2,2,11,11-tetramethyldodecanediene-4,8,
1,10-dimethoxy-2,2,9,9-tetramethyl-4-vinyl-decene-6,
1,10-diisopropoxy-2,2,9,9-tetramethyl-4-vinyl-decene-6,
1,10-dibenzyloxy-2,2,9,9-tetramethyl-4-vinyl-decene-6,
1,10-diphenylmethoxy-2,2,9,9-tetramethyl-4-vinyl-decene-6,
1,10-di(p-ethylbenzyloxy)-2,2,9,9-tetramethyl-4-vinyl-decene-6,
1,10-di-p-xylyloxy-2,2,9,9-tetramethyl-4-vinyl-decene-6,
1,10-di-m-xylyloxy-2,2,9,9-tetramethyl-4-vinyl-decene-6,
di-"iso"-octanoxy-2,2,9,9-tetramethyl-4-vinyl-decene-6, (the word "iso" denotes that the alkyl group was originally derived from a mixture of branched alcohols from the "oxo" reaction), 1,10-di($\alpha'$-ethylhexanoxy)-2,2,9,9-tetramethyl-4-vinyl-decene-6,
1,10-di($\alpha'$-methylcyclohexanoxy)-2,2,9,9-tetramethyl-4-vinyl-decene-2,
1,10-didodecanoxy-2,2,9,9-tetramethyl-4-vinyl-decene-6,
1,8-dimethoxy-2,2,7,7-tetramethyl-4,5-divinyloctane,
1,8-isopropoxy-2,2,7,7-tetramethyl-4,5-divinyloctane,
and 1,8-dibenzyloxy-2,2,7,7-tetramethyl-4,5-divinyloctane.

The diunsaturated diethers are unique compounds by virtue of two neopentyl groups situated at opposite terminal positions adjacent the respective ether groups and of their long chain hydrocarbon groups. The diunsaturated diethers are useful as rodenticides. Also, they can be used as lubricants in hydraulic fluids; they are amenable for epoxidations by peracids or performic or peracetic acid to form the diepoxides; these in turn are useful stabilizers for polyvinyl halide resins. Amongst the diunsaturated diethers, the 4-vinyl-substituted ones are polymerizable with other copolymerizable monomers, such as other vinyl monomers. For instance, they can be polymerized with lower esters of acrylic or methacrylic acids or with styrene to give liquid polymers which in turn are suited as lubricants or as additives thereto.

In a further aspect of the invention, the diunsaturated diethers, in which R and $R^1$ represent an aliphatic saturated group or hydrogen, are employed as primary materials for making the corresponding saturated tetra-methyl-substituted diethers of formula:

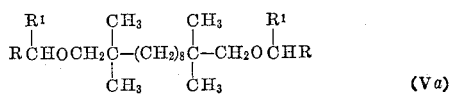

(Va)

and

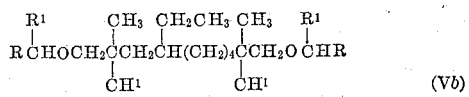

(Vb)

wherein R and $R^1$ are a hydrogen atom or an aliphatic saturated group preferably alkyl of 1 to 6 carbon atoms or hydrogen. Here again, the two R and two $R^1$ substituents need not be identical and such mixed esters are obtained from mixed diunsaturated diethers. Typical of these ethers are 1,12-dimethoxy-2,2,11,11-tetramethyldodecane,
1,12-diisopropoxy-2,2,11,11-tetramethyldodecane,
1,12-didodecanoxy-1,2,11,11-tetramethyldodecane,
1,2-dicyclohexanoxy-2,2,11,11-tetramethyldodecane,
1,10-dimethoxy-2,2,9,9-tetramethyl-4-ethyldecane,
1,10-diisopropoxy-2,2,9,9-tetramethyl-4-ethyldecane,
1,10-di"iso"octanoxy-2,2,9,9-tetramethyl-4-ethyldecane,
1,10-didodecanoxy-2,2,9,9-tetramethyl-4-ethyldecane,
1,10-dicyclohexanoxy-2,2,9,9-tetramethyl-4-ethyldecane,
1,10-($\alpha'$-methylpentanoxy)-2,2,9,9-tetramethyl-4-ethyldecane,
1,10-($\alpha',\alpha'$-dimethylbutanoxy)-2,2,9,9-tetramethyl-4-ethyldecane,
1,10-di($\alpha'$-methyl-$\beta'$-ethylpentanoxy)-2,2,9,9-tetramethyl-4-ethyldecane,
1,10-($\alpha'$-ethylcyclopentanoxy)-2,2,9,9-tetramethyl-4-ethyldecane, and the like. The term "iso" here denotes that the alkyl group was originally derived from a mixture of branched alcohols from the "oxo" reaction.

In accordance with this aspect of the invention, the ether substituted allyl halides are treated by a method of catalytic hydrogenation under pressure. Any catalyst which promotes the saturation of the double bond is satisfactory for the present purpose. Satisfactory results have been obtained with the noble metals and best results with Raney nickel. The catalysts are used individually or in any desired complex with or without a carrier, such as charcoal or kieselguhr. A catalytic amount should be employed, and this may depend on the other conditions selected including the particular diether that is being treated. Generally, the catalyst is used in amount ranging from 0.01 to 20%, and commonly from 1 to 5% by weight.

The temperature selected for catalytic reduction depends to a considerable extent on the particular diunsaturated diether which is treated, the catalyst selected and the pressure applied. Generally, catalytic reduction in the presence of the noble metals proceeds at a temperature in the range of 5 to 60° C. in conjunction with moderate pressures, such as atmospheric pressure to 50 p.s.i. With Raney nickel, usually a broader temperature range, as 5 to 200° C., can be used and the pressures can be increased to 2000 p.s.i., a range of 100 to 1500 being quite satisfactory. The uppermost pressure is generally limited by safety and convenience of operation. One skilled in the art will make minor adjustments to reach the optimum in the conditions for catalytic reduction of the diunsaturated diethers.

Optionally, a solvent for the ether may be used. Convenient solvents include aliphatic and aromatic hydrocarbons, like benzene, xylene, n-heptane, and isooctane; or alcohols like the lower alkanols such as ethanol; and like solvents.

The progress of the hydrogenation may be followed by measuring the drop in pressure of hydrogen. Theory requires two moles of hydrogen gas per mole of ether substituted allyl halides commonly in excess is employed to insure completeness of reaction. At the end of the reaction, solvent is recovered by stripping and the saturated diethers are separated by distillation, preferably under reduced pressure.

These saturated diethers are useful products. They have good solvency powder; they can be used as polishes or as ingredients therein. They make useful lubricating fluids alone or in conjunction with synthetic or natural lubricants. They make useful adjuncts for unsaturated polyester resins used as coatings where they can delay the reaction of oxygen with the monomer thus retarding the development of tackiness. In other air-dried coatings they act as regulators of the curing time which they can lengthen as desired.

Another aspect of the invention provides the long chain glycols in which each alcohol group has a neopentyl structure, and a method for their preparation. The glycols are 2,2,11,11-tetramethyldodecanediol-1,12, 2,2,9,9-tetramethyl - 4 - ethyldecanediol-1,10, and 2,2,7,7-tetramethyl-4,5-diethyloctanediol-1,8. These branched glycols are prepared from the diunsaturated diethers of Formulas IV(a), IV(b), and the divinyl type, wherein R and $R^1$ represent hydrogen atoms, phenyl groups or alkylphenyl groups, in which the sum total of alkyl substituents generally does not exceed 18 carbon atoms and with the proviso that R and $R^1$ are both never a hydrogen atom. The method of preparation of these branched glycols from the diunsaturated diethers comprises a catalytic hydrogenolysis. Typical illustrations of the diunsaturated ethers which are the starting materials for the preparation of the branched glycols are given above.

In the method for preparing the branched glycols, any catalyst promoting catalytic hydrogenolysis may be used including nickel, such as Raney nickel or the noble metals, as palladium or platinum. Improved results are obtained with the noble metals. Typical catalysts include palladium black, platinum black, palladium-barium sulfate, palladium-charcoal, Raney nickel, Raney nickel-aluminum alloy and the like. Generally, with Raney nickel, the temperature ranges from 5° to 250° C., especially from 15° to 100° C. Optionally, pressure may be used to facilitate the reaction; in such cases, 5 to about 4000 p.s.i. of pressure is a satisfactory practical range. With the noble metals, catalytic hydrogenolysis proceeds at a temperature in the range of 5 to 60° C., in conjunction with moderate pressures, such as atmospheric pressure to 50 p.s.i. The amount of catalyst employed may broadly vary. In the range of 0.1 to 20%, especially 1 to 5%, by weight, gives satisfactory results. If a solvent is employed, it may be any aliphatic or aromatic hydrocarbon or an alkanol, preferably a lower alkanol. Typical are benzene, n-heptane, ethanol, and the like. The progress of the reaction is followed by the drop in pressure of hydrogen. One mole of hydrogen per equivalent of ethylenic unsaturation is required theoretical amount, but generally an excess is provided to insure completion of the reaction. When the reaction is terminated, the catalyst is separated from the product which is then freed of solvent and the glycol is obtained, for instance, by distillation, preferably under reduced pressure.

Alternatively, the branched glycols may be obtained by hydrogenolysis of the above described diunsaturated diethers with lithium-aluminum hydride. The reaction proceeds at moderate temperature, as in the range of 20 to 40° C., in the presence of a suitable inert organic solvent, under anhydrous conditions. The hydrogenolysis yields the diunsaturated branched glycols which in turn, may be saturated by catalytic hydrogenation.

The long chain bis-neopentyl glycols are valuable compounds by virtue of their unique structure. The esters of these glycols with monobasic acids are useful as plasticizers for polyvinyl halide resins. The polyesters of the glycols and dibasic acids have unusual resistance to degradation as lubricants or as additives thereto, for instance, in jet engines where extremely high temperatures are encountered. Furthermore, they are good solvents for numerous organic compounds. Their esters make good plasticizers for polyvinyl halide resins to which they impart good electric insulation and resistance to water hydrolysis. This lends them especially as plasticizers for polyvinyl halide resins used in intercontinental cables and other electrical cables. The glycols are oxidizable to dibasic acids by oxidation. They are also useful cross-linking agents for increasing the molecular weight of polymers, such as epoxy resins and polyesters.

The following examples are provided by way of illustration and not to limit the scope of the invention. It will be clear to one skilled in the art that by similar manipulative steps, by substitution of other reactants and of the optional ingredients used in the process, optimum conditions are readily obtained for the preparation of each one of the various compounds of the invention.

*Example 1*

A mixture of 800 parts (9.3 moles) of methallyl methyl ether and 712 parts (20.5 moles) of concentrated hydrochloric acid is stirred for 4 hours at 0° C. As stirring is discontinued and no further exotherm is observed, the reaction mixture separates into two layers. The upper organic layer is separated and washed twice with a saturated solution of sodium chloride and dried over anhydrous magnesium sulfate. Distillation of the reaction product yields β-methoxy-t-butyl chloride having a boiling point of 104° to 106° C., $n_D^{20}$ 1.4090. The product, $C_5H_{11}ClO$, contains 48.96% carbon (theoretical 48.98%), 9.08% hydrogen (theoretical 9.05%), and 28.8% chlorine (theoretical 28.92%).

*Example 2*

(a) β-octadecanoxy-t-butyl chloride is obtained from methallyl octyl ether.

(b) β-cyclohexanoxy-t-butyl chloride is obtained in a similar manner from methallyl cyclohexyl ether.

(c) β-(α′,α′-dimethylbutanoxy)-t-butyl chloride results from methallyl α,α-dimethylbutanyl ether.

*Example 3*

(a) β-methoxy-t-butyl bromide is prepared in a like manner from methallyl methyl ether and hydrobromic acid.

(b) Likewise, β-octadecanoxy-t-butyl chloride is obtained from methallyl octadecyl ether. With hydrobromic acid β-octadecanoxy-t-butyl chloride results.

(c) In a like manner, β-cyclohexanoxy-t-butyl chloride is the product of the reaction of methallyl cyclohexyl ether and hydrochloric acid.

*Example 4*

β-(α′-ethyl)hexanoxy-t-butyl chloride is prepared from methallyl-2-ethylhexyl ether.

*Example 5*

To 1400 parts (16 moles) of concentrated hydrochloric acid is added 681.3 parts (4.2 moles) of methallyl benzyl ether. The addition is carried out at 0° C. and the resulting reaction mixture is stirred at 0° C. for one hour. The reaction mixture is then allowed to slowly warm up to room temperature. When the temperature of the mixture reached 25° C., an exotherm develops which raises the temperature to 37° C. The reaction mixture is stirred overnight at room temperature. Benzene is added and the benzene solution of the product is separated from the lower aqueous layer. The benzene solution is saturated with hydrogen chloride gas for three hours and the benzene evaporated off under reduced pressure. Vacuum distillation of the residue gives β-benzyloxy-t-butyl chloride having a boiling point of 128° to 129° C. at 20 ml., $n_D^{20}$ 1.5001. The product, $C_{11}H_{15}ClO$, contains 66.54% carbon (theoretical 66.49%), 7.61% hydrogen (theoretical 7.61%), and 17.08% chlorine (theoretical 17.85%).

*Example 6*

β-α-ethylhexylbenzyloxy-t-butyl chloride is prepared in a like manner from methallyl(α-ethylhexyl)benzyl ether.

*Example 7*

In a three-necked flask equipped with a Dry-Ice condenser, stirrer, and gas dispersion tube, there are charged 122.6 parts (1.0 mole) of β-methoxy-t-butyl chloride and catalyst. The catalyst is prepared by dissolving 8.0 parts of anhydrous stannic chloride in 7.5 parts of nitroethane and the subsequent addition of two drops of water. The addition of the catalyst is followed by charging 2 parts of hydrogen chloride gas through the gas dispersion tube. The flow of butadiene is then initiated adjusting the rate to maintain the temperature of the reaction mixture at 10° C. The flow of butadiene is discontinued when the temperature of the reaction mixture drops back to 0° C. and then reaction mixture is stirred for another hour. The reaction product is purified by washing with methanol and with water followed by a washing with a 5% solution of oxalic acid, the aqueous layers being discarded. The product is washed again with an oxalic acid solution followed with a sodium chloride wash. The product is distilled under reduced pressure to yield 102 parts 1-chloro-5,5-dimethyl-6-methoxyhexene-2 in a mixture with 3-chloro-5,5-dimethyl-6-methoxyhexene-1. The product, $C_9H_{17}ClO$ has a boiling point of 88° to 110° C. at 12 mm. $n_D^{20}$ 1.4535; it contains 61.25% carbon (theoretical 61.17%), 9.71% hydrogen (theoretical 9.70%), and 20.7% chlorine (theoretical 20.07%).

*Example 8*

(a) In a like manner, there is prepared 1-chloro-5,5-dimethyl-6-(2′-ethylhexanoxy)hexene-1 from β-(α-ethyl)hexanoxy-t-butyl chloride.

(b) In a similar manner, 3-chloro-5,5-dimethyl-6-dodecanoxy-hexene-1 and 1-chloro-5,5 - dimethyl - 6 - dodecanoxy-hexene-2 are the products of the reaction of butadiene and β-dodecanoxy-t-butyl chloride.

(c) Likewise, 3-chloro-5,5-dimethyl-6 - cyclohexanoxy-hexene-1 and 1-chloro-5,5-dimethyl - 6 - cyclohexaneoxy-hexene-2 are the products of reacting butadiene and β-cyclohexeneoxy-t-butyl chloride.

*Example 9*

To a flask equipped as in Example 1, there are charged 136.7 parts (0.91 mole) of β-isopropoxy-t-butyl chloride and catalyst. The catalyst is prepared by the addition of 8.1 parts of anhydrous stannic chloride to 6.8 parts of nitroethane followed by 0.5 ml. of water; to this mixture 4 parts of hydrogen chloride gas is added. Butadiene is then charged and its flow is regulated in order to maintain the exotherm at about 5° C. When the exotherm subsides, gas feed is discontinued. The product is washed of catalyst by alternative washes of oxalic acid and sodium chloride solutions. Distillation of the product yields 76.3 parts of a mixture of 3-chloro-5,5-dimethyl-6-isopropoxy-hexene and 3-chloro-5,5-dimethyl-6-isopropoxyhexene-1. The mixture has a boiling point of 90° to 120° C. at 8 mm.

and $n_D^{20}$ 1.4565. The product, $C_{11}H_{21}ClO$, contains 64.39% carbon (theoretical 64.53%) 10.04% hydrogen (theoretical 10.34%), and 17.05% chlorine (theoretical 17.20%).

Example 10

Likewise, 3-chloro-5,5-dimethyl-6-isohexanoxyhexene-1 and 1-chloro-5,5-dimethyl-6-isohexanoxyhexene-2 are the reaction products of butadiene and β-isohexanoxy-t-butyl chloride.

Example 11

In a cyclic reactor, there are added 297.1 parts (1.49 moles) of β-benzoxyl-t-butyl chloride. To it there are charged catalyst, which is prepared by the addition of 24 parts of anhydrous stannic chloride to 24 parts of nitroethane and butadiene. The exotherm due to the addition of catalyst and butadiene rises to about 35° C. and the addition of butadiene is maintained at a temperature of about 40° C. The flow of butadiene is discontinued as no further uptake is observed. The product is washed in accordance with the procedure described in Example 9 and the distillation gives 105 parts of 1-chloro-5,5-dimethyl-6-benzloxyhexene-2 in a mixture with 3-chloro-5,5-dimethyl-6-benzyloxyhexene-1. The product, $C_{15}H_{21}ClO$, boils at 145° to 155° C. at 15 mm. and $n_D^{20}$ 1.5086; it contains 71.54% carbon (theoretical 71.26%), 8.14% hydrogen (theoretical 8.41%) and 14.11% chlorine (theoretical 14.03%).

Example 12

In a similar manner, 3-chloro-5,5-dimethyl-xylyloxyhexene-1 and 1-chloro-5,5-dimethyl-xylyloxyhexene-2 are the reaction products of butadiene and β-xylyloxy-t-butyl-chloride.

Example 13

To a solution of 126.3 parts (0.71 mole) of 1-chloro-5,5-dimethyl-6-methoxyhexene-2 and its isomer in 150 parts of acetonitrile is added 23.4 parts (0.42 mole) of powdered iron, 2.4 parts (10% based on the weight of the iron) of Raney nickel. A slow stream of nitrogen is passed into the reaction flask and the reaction is heated with stirring at 60° C. for four hours. After cooling, 150 parts of 10% sulfuric acid is added with stirring followed by addition with benzene. After addition with benzene, the organic layer is separated. The benzene solution of the product is washed until neutral benzene solvent is distilled off azeotropically with water. Distillation of the residue yields 1,12-dimethoxy-2,2,11,11-tetramethyldodecanediene-4,8 in a mixture with 1,10-dimethoxy-2,2,9,9-tetramethyl-4-vinyl-decene-6. The product, $C_{18}H_{34}O_2$, has a boiling point of 103° to 107° C. at 2 mm.; it contains 76.60% carbon (theoretical 76.25%), 12.14% hydrogen (theoretical 12.13%), and has a molecular weight of 280±2 (theoretical 282.5).

Example 14

Likewise, 1,10-dodecanoxy-2,2,9,9-tetramethyl-4-vinyldecene-6 and 1,12-dodecanoxy-2,2,11,11-tetramethyl-dodecanediene-4, 8 are the product of reaction of the coupling of 3-chloro-5,5-dimethyl-6-dodecanoxyhexene-1 and 1-chloro-5,5-dimethyl-6-dodecanoxyhexene-2.

Example 15

To a solution of 73 parts (0.35 mole) of isopropoxyoctenyl chloride in mixture with its isomer in 150 parts of acetonitrile is added 12.3 parts (0.22 mole) of powdered iron and 1.2 parts (10% based on iron used) of Raney nickel. The reaction flask is flushed with nitrogen and the mixture is heated to 45° C. for 24 hours. After cooling, the procedure of the Example 14 is followed and distillation of the residue gives 1,12-dimethoxy-2,2,11,11-tetramethyldodecanediene-4,8 in a mixture with 1,10-dimethoxy-2,2,9,9-tetramethyl-4-vinyl-decene-6. The product, $C_{22}H_{42}O_2$, has a boiling point of 100° to 110° C. at 0.35 mm., $n_D^{20}$ 1.4567; it contains 76.92% carbon (theoretical 76.09%) and 11.77% hydrogen (theoretical 12.51%).

Example 16

Likewise 1,12-(2'-methyl-3'-ethyl)pentanoxy-2,2,11,11-tetramethyldodecanediene-4,8 and 1,10-(α'-methyl-β'-ethylpentanoxy)-2,2,9,9-tetramethyl-4-vinyl decene-6 results from the reaction of 3-chloro-5,5-dimethyl-6-(α'-methyl-β'-ethylpentanoxy)hexene-1 and its isomer.

Example 17

To a solution of 388 parts (1.54 mole) benzoxyoctenyl chloride in 350 parts of redistilled acetonitrile is added 58.8 parts (1.05 mole) of powdered iron and 5.9 parts (10% based on amount of iron used) of Raney nickel. The reaction is heated with stirring under a nitrogen atmosphere to 70° C. for 30¼ hours and then refluxed at 86° C. for 20¼ hours. The reaction mixture is purified by distillation through a falling film still under highly reduced pressure to give 1,12-dibenzyloxy-2,2,11,11-tetramethyldodecanediene-4,8, in a mixture with 1,10-dibenzyloxy-2,2,9,9-tetramethyldodecane-4-vinyl-decene - 6. The product's $n_D^{25}$ is 1.5168 and it boils at 240° C. at 0.14 mm.

Example 18

In a like manner, 1,12-di-p-xylyloxy-2,2,11,11-tetramethyldodecanediene-4,8 and 1,10-di-p-xylyloxy-2,2,9,9-tetramethyldodecane-4-vinyl-decene-6 is the reaction product of the coupling of 1-chloro-5,5-dimethyl-6-benzylhexene-2 and 3-chloro-5,5-dimethyl-6-benzylhexene-1.

Example 19

92 parts (0.32 mole) of 1,12-dimethoxy-2,2,11,11-tetramethyldodecanediene-4,8 in mixture with its 4-vinyl isomer in ethanol, with 5% Raney nickel as catalyst, is charged to a reaction vessel. The pressure is raised to 500 and then gradually to 1000 p.s.i. at 80° C. The reaction product is distilled, yielding 1,12-dimethoxy-2,2,11,11-tetramethyldodecane and 1,10-dimethoxy-2,2,9,9-tetramethyl-4-ethyldecene having a boiling point of 115° to 120° C. at 0.35 mm., $n_D^{20}$ 1.4418. The product, $C_{18}H_{34}O_2$, contains 75.86% carbon (theoretical 75.46%) and 13.35% hydrogen (theoretical 13.37%).

Example 20

Likewise, 1,12-dihexanoxy-2,2,11,11-tetramethyldodecane and 1,10-dihexanoxy-2,2,9,9-tetramethyl-4-ethyldecane are the products of 1,12-dihexanoxy-2,2,11,11-tetramethyldodecandiene-4,8 and 1,10-dihexanoxy-2,2,9,9-tetramethyl-4-vinyl-decene-6.

Example 21

A mixture of 50.6 parts (0.15 mole) of 1,12-diisopropoxy-2,2,11,11-tetramethyldodecanediene-4,8 with its 4-vinyl isomer in ethanol and in the presence of 5% Raney nickel, is catalytically reduced by feeding hydrogen to the reaction vessel; feeding continued until the pressure reaches 1200 p.s.i.; the temperature is raised and maintained at 150° C. After 8 hours, when no further uptake of hydrogen is observed, pressure is discontinued, the reaction mixture is cooled and the residue yields 1,12-diisopropoxy-2,2,11,11-tetramethyldodecane and 1,10-diisopropoxy-2,2,9,9,-tetramethyl-4-ethyldecane. The product, $C_{22}H_{46}O_2$ has a boiling point of 110° to 115° C. at 0.35 mm., $n_D^{20}$ 1.4407; it contains 77.18 carbon (theoretical 77.58%) and 12.34% hydrogen (theoretical 12.65%).

Example 22

Likewise, 1,10-di(α'-methyl-β'-ethylpentanoxy)-2,2,9,9-tetramethyl-4-ethyldecane and 1,12-di(α'-methyl-β'-ethylpentanoxy)-2,2,9,9,-tetramethyldodecane is the product of catalytic reduction of 1,10-di(α'-methyl-β'-ethylpentanoxy)-2,2,9,9-tetramethyl-4-vinyl-decene-6, and 1,12-di(α'-methyl-β'-ethylpentanoxy)-2,2,11,11 - tetramethyldodecanediene-4,8.

Example 23

A solution of 68 parts of 1,12-dibenzyloxy-2,2,11,11-tetramethyldodecadiene-4,8 and 1,10-dibenzyloxy-2,2,9,9-tetramethyl-4-vinyldecene-6 in ethanol is treated with hydrogen in a reaction vessel in the presence of 5 parts of Raney nickel catalyst at a pressure of 1500 p.s.i. and a final temperature of 200° C. There is then added to the reaction product 0.2 part palladium or charcoal catalyst and hydrogen is fed till 50 p.s.i. pressure is maintained at 25° C. The product is then subjected to 3700 lbs. p.s.i. under hydrogen in the presence of 5 parts Raney nickel. The residue, obtained when the solvent is removed, has a molecular weight of 215 (calculated 218). The products are identified as 2,2,11,11-tetramethyldodecanediol-1,12 and 2,2,9,9-tetramethyl-4-ethyldodecanediol-1,10.

Example 24

To 40 parts of 1,12-dibenzyloxy-2,2,11,11-tetramethyldodecadiene-4,8 and 1,10-dibenzyloxy-2,2,9,9-tetramethyl-4-vinyldecene-6 in ethanol is added 5 parts of Raney nickel catalyst. The mixture is subjected for 6 hours to a hydrogen pressure of 4000 p.s.i. and a final temperature of 200° C. to yield 2,2,11,11-tetramethyldodecanediol-1,12 and 2,2,9,9-tetramethyl-4-ethyldodecanediol-1,10.

Example 25

(a) Likewise, a solution of 1,12-dixylyloxy-2,2,11,11-tetramethyldodecadiene-4,8 in mixture with 1,10-dixylyloxy-2,2,9,9-tetramethyl-4-vinyldecene-6 yields the same glycol products as in Example 22.

(b) Similarly, the p-n-propylbenzyloxy substituted diunsaturated ether mixture yields the same branched glycols as in Example 22.

The preparation of methallyl benzyl ether and of alkyl-substituted benzyl ether is illustrated in the following examples:

Example 26

In a reaction flask there are mixed 721 parts (10 moles) of methallyl alcohol and 480 parts (6 moles) of a 50% sodium hydroxide solution. The temperature of the solution rises to 40° C. during the addition of sodium hydroxide. To this mixture there is slowly added with stirring 633 parts (5 moles) of benzyl chloride. The temperature rises to 70° C. during the addition, after which the reaction mixture is gently heated to 85° C. for seven hours. The reaction mixture is then cooled and the precipitated sodium chloride is filtered off. The upper organic layer is separated and distilled under reduced pressure to yield 710.1 parts (87.5%) of methallyl benzyl ether having a boiling point of 104° C. at 20 mm. pressure, $n_D^{20}$ 1.5136. The product, $C_{11}H_{14}O$, contains 81.31% carbon (theoretical 81.44%), and 8.72% hydrogen (theoretical 8.70%).

Example 27

To 900 parts (8.33 moles) of benzyl alcohol is added 800 parts (10 moles) of a 50% aqueous sodium hydroxide solution. To the solution there is added dropwise 15.08 parts (16.66 moles) of methallyl chloride. The temperature rises to 70° C. at which it is maintained for 7 hours. There is obtained 125 parts of product, methallyl benzyl ether. The yield is 83%.

Example 28

In a like manner, methallyl m-xylyl ether is prepared.

We claim:

1. An ether-substituted allyl halide having a neopentylene group, said ether being selected from the group consisting of

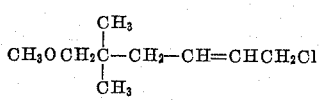

and

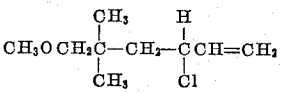

2. An ether-substituted allyl halide having a neopentylene group, said ether being selected from the group consisting of

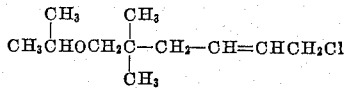

and

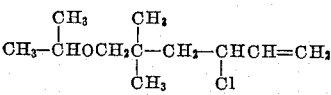

3. An ether-substituted allyl halide having a neopentylene group, said ether being selected from the group consisting of

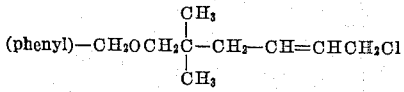

and

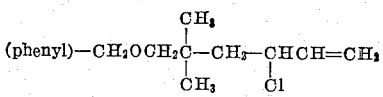

4. A process for the preparation of ethers having a neopentylene group, said ethers having the formula

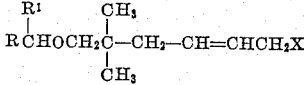

and

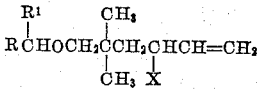

were both R and $R^1$ are selected from the group consisting of alkyl of 1 to 12 carbon atoms, the phenyl group and a hydrogen atom, X is a halogen atom of atomic number 17 to 35 inclusive, said process comprising reacting by bringing together a halo-t-butyl ether of the formula

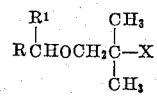

wherein R, $R^1$ and X are defined above, with butadiene, in the presence of a Lewis acid catalyst at a temperature not exceeding 100° C. and below that which causes substantial polymerization of the butadiene.

5. The process of claim 4 in which in the formula X is chlorine.

References Cited by the Examiner
UNITED STATES PATENTS

| | | | |
|---|---|---|---|
| 2,624,753 | 1/1953 | Emerson et al. | 260—614 X |
| 2,787,643 | 4/1957 | Lane et al. | 260—614 |
| 3,035,102 | 5/1962 | Marcus | 260—614 X |

OTHER REFERENCES

Royals, Advanced Organic Chemistry (1956), p. 385.
Groggins, Unit Processes in Organic Synthesis (1952), page 800.

LEON ZITVER, *Primary Examiner.*

CHARLES B. PARKER, *Examiner.*

B. HELFIN, *Assistant Examiner.*